Figure 1A:
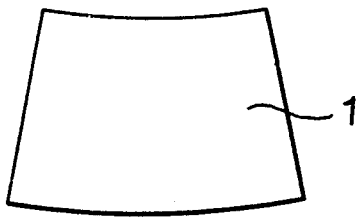

United States Patent
Hirano

[11] Patent Number: 5,108,479
[45] Date of Patent: Apr. 28, 1992

[54] PROCESS FOR MANUFACTURING GLASS WITH FUNCTIONAL COATING

[75] Inventor: Akira Hirano, Yokohama, Japan

[73] Assignee: Asahi Glass Company LTD, Tokyo, Japan

[21] Appl. No.: 594,058

[22] Filed: Oct. 9, 1990

[30] Foreign Application Priority Data

Oct. 9, 1989 [JP] Japan ................... 1-262086

[51] Int. Cl.$^5$ ................... C03C 25/02; C03C 27/00
[52] U.S. Cl. ................... 65/60.52; 65/106; 65/114; 427/108; 427/126.2; 427/126.3; 427/165; 427/226; 427/282; 427/287
[58] Field of Search ............ 427/287, 108, 226, 126.2, 427/126.3, 282; 65/60.1, 60.5, 60.52, 106, 114

[56] References Cited

U.S. PATENT DOCUMENTS

| | | | |
|---|---|---|---|
| 4,411,703 | 10/1983 | Whitehouse | 427/226 X |
| 4,476,156 | 10/1984 | Brinker et al. | 65/60.52 X |
| 4,496,398 | 1/1985 | Whitehouse | 427/226 X |
| 4,715,879 | 12/1987 | Schmitte et al. | 65/106 X |
| 4,770,685 | 9/1988 | Boaz | 65/106 X |
| 4,857,096 | 8/1989 | Boaz | 65/60.52 X |

FOREIGN PATENT DOCUMENTS

| | | | |
|---|---|---|---|
| 701759 | 1/1965 | Canada | 65/60.5 |
| 1178846 | 3/1959 | France . | |

OTHER PUBLICATIONS

Chemical Abstracts, vol. 101, No. 2, Jul. 1984, p. 251, abstract no. 11457j, Columbus, Ohio, U.S.; & JPA-59 27 961 (Alps Electric) Feb. 14, 1984 *complete abstract*.

*Primary Examiner*—Robert L. Lindsay

[57] ABSTRACT

Disclosed herein is a process for manufacturing glass with functional coating by the steps of: 1) forming a film on a predetermined portion of a glass plate by screen-printing of a liquid for forming functional coating which contains therein a metal oxide material; and 2) subjecting the glass plate to the bending treatment and/or tempering treatment by heating the same, with simultaneous baking of the printed film to thereby form the functional coating containing the metal oxide as the principal constituent.

Disclosed also is a process for manufacturing glass with functional coating as a combiner for head-up display, wherein, after forming the functional coating by simultaneously bending and/or tempering of the glass plate and baking the printed film, as in the above-mentioned process, the glass plate with the functional coating thereon is joined together with another sheet of glass plate with interposition of a plastic intermediate film between them in a manner to cause the surface of the glass plate, on which the functional coating has been formed, to be exposed outside to thereby obtain a laminated glass plate.

6 Claims, 3 Drawing Sheets

CUTTING (CHAMFERING AND CLEANING)

PRINTED FILM FORMING (SCREEN-PRINTING)

FIGURE 1(b')

DRYING OF PRINTED FILM

BENDING AND/OR TEMPERING; BAKING OF PRINTED FILM

LAMINATING

PROCESS FOR MANUFACTURING GLASS WITH FUNCTIONAL COATING

This invention relates to a process for manufacturing glass with functional coating, and also to a process for manufacturing a combiner for head-up display (HUD) using such glass.

As a method for providing a base plate (or substrate) such as glass, etc. ith a metal oxide thin film coating, there have so far been known various methods such as vapor-deposition method, sputtering method, and other physical expedients; or the wet coating methods such as the immersing method, roll-coating method, meniscus-coating method, and so forth, wherein a liquid containing therein a material which can be turned into a metal oxide is applied onto the substrate; or various other methods. While the wet coating methods are advantageous in that they contribute to a reduced cost of manufacturing in comparison with the physical expedients, both wet-coating methods and the physical coating methods are disadvantageous in that, when it is desired to form a film on one part alone of the base plate having a wide area, with good outer appearance, the remaining part of the substrate where no film is to be formed should be masked during the film formation, or the film as formed over the entire substrate should be removed by etching after the film formation, leaving only the portion where the film formation is intended. This would, after all, lead to complicated manufacturing process, hence increased production cost.

It is therefore an object of the present invention to solve various disadvantages inherent in the conventional techniques as mentioned in the foregoing.

With a view to attaining the above-mentioned object, the present invention provides a process for manufacturing glass with functional coating, which is characterized by the steps of: 1) forming a film on a predetermined portion of a glass plate by screen-printing of a liquid for forming functional coating which contains therein a material to be turned into metal oxide; and 2) subjecting said glass plate to the bending and/or tempering treatment by heating the same, with simultaneous baking of said printed film to thereby form the functional coating containing the metal oxide as the principal constituent.

Figure 2:
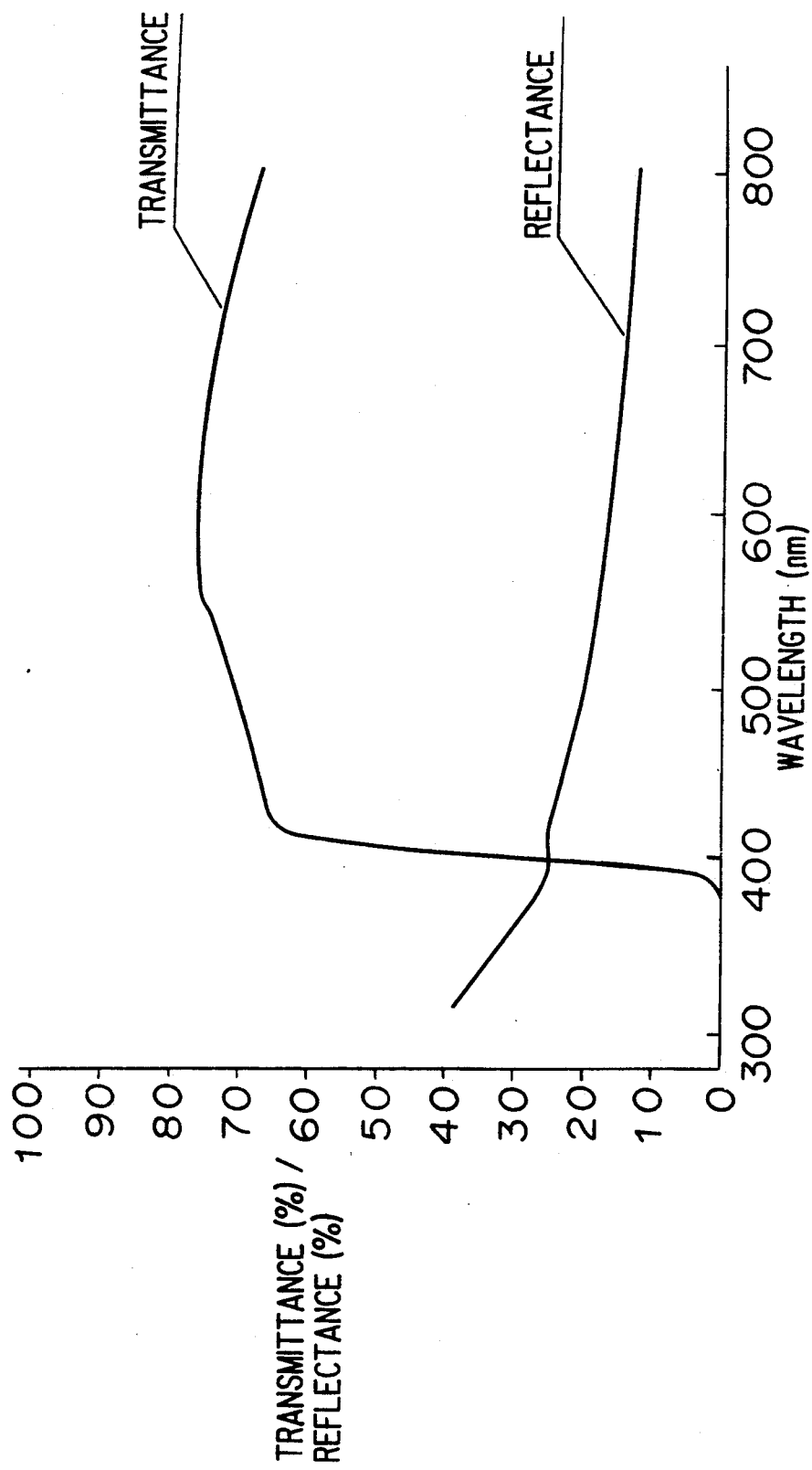
Figure 3:
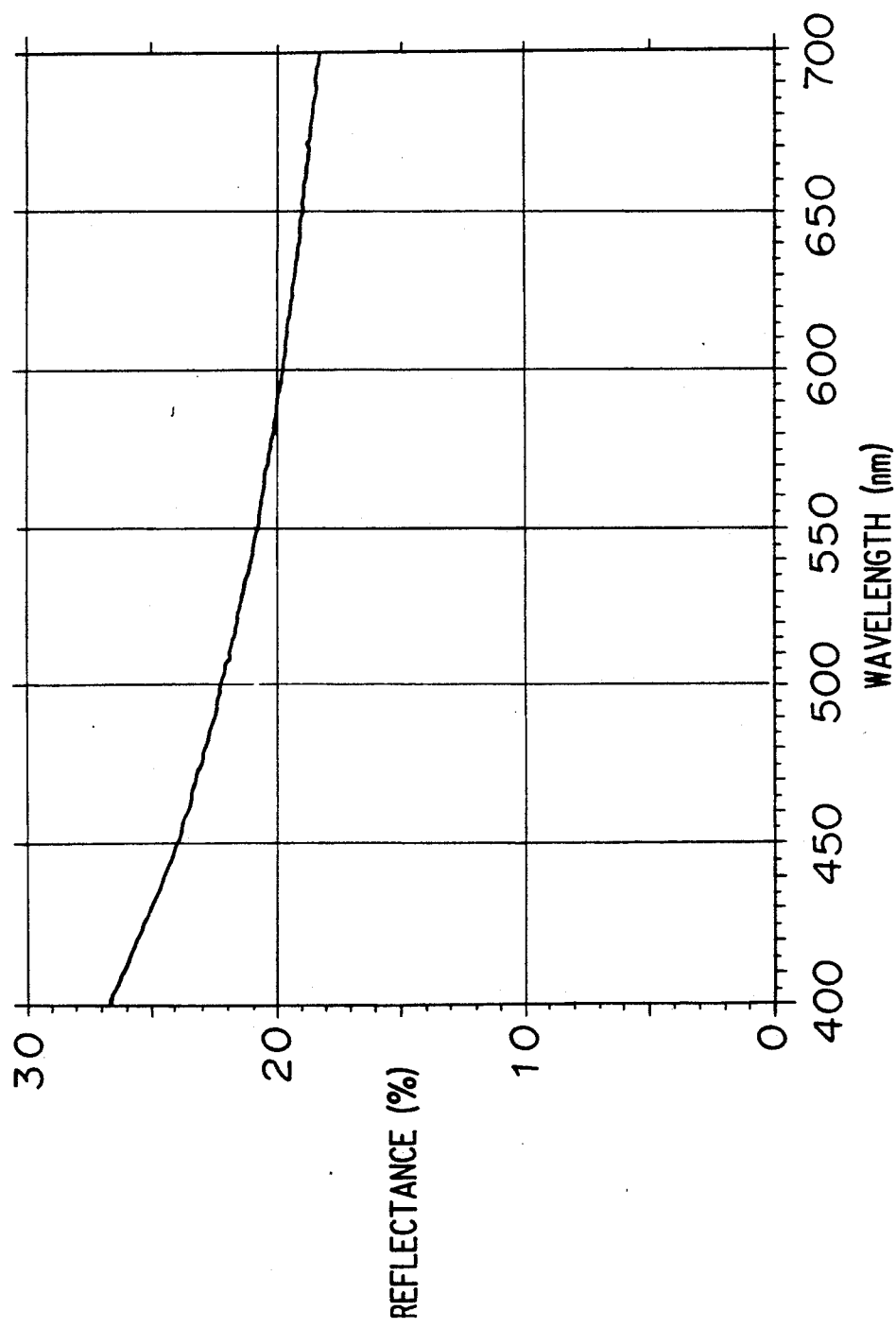

One way of carrying out the invention will be described in detail below with reference to the accompanying drawings which illustrate only one specific embodiment, in which:

FIGS. 1(a) to 1(d) are explanatory diagrams showing the steps for manufacturing glass with functional thin film coating according to the present invention;

FIG. 2 is a graphical representation showing the spectra at the part of the functional thin film coating of the combiner for HUD in the sole preferred embodiment of the present invention; and FIG. 3 is a graphical representation showing the reflecting characteristic of the film surface with an incident angle of light of 65 degrees at the portion of the functional thin film coating for the HUD combiner according to the sole preferred embodiment of the present invention.

Referring to FIGS. 1(a) to 1(d) illustrating the steps for manufacturing the glass with the functional thin film coating according to the present invention, the glass plate is first cut into a desired shape as shown in FIG. 1(a). Subsequently, the cut edge of the glass plate should preferably be chamfered and cleaned.

Figure 1B:
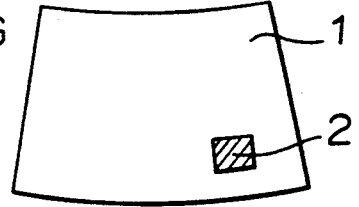

Then, as shown in FIG. 1(b), a liquid for forming the functional thin film coating which contains therein a material to be turned into a metal oxide by baking is applied by screen-printing onto a predetermined portion of the glass plate 1, thereby forming the printed film 2. This functional thin film forming liquid should preferably be adjusted its viscosity to a range of from 1,000 to 20,000 cps (centi-poises) at 25° C., or more preferably from 2,000 to 6,000 cps at 25° C. by addition of a viscosity-increasing agent (or a thickener) such as, for example, ethyl cellulose, nitrocellulose, and other cellulose type thickener, or others. When the viscosity is below 1,000 cps, the liquid has excessive fluidity with the consequence that stability in the screen-printing, or a predetermined film thickness cannot be obtained after the printing, or other disadvantages. On the other hand, when the viscosity exceeds 20,000 cps, the printed film after its baking becomes so porous that its durability from both chemical and mechanical aspects will become unfavorably poor. As already mentioned in the foregoing, the functional thin film forming liquid contains therein a material to be turned into a metal oxide. For such material metal alkoxide is preferred. For example, there may be used alkoxides of Ti, Ta, Zr, In, Sn, Si, and so on, or mixtures of more than two kinds of these alkoxides. These materials may be chosen arbitrarily by taking into consideration the optical characteristics, etc. required of the intended functional coating. As an example, when it is desired to obtain a high reflective film, as the functional coating for the HUD combiner, etc., there may be selected the metal alkoxide which brings the refractive index n of the high reflective film to a value of 1.5 or above, or more particularly from about 1.8 to 2.3. More particularly, each metal alkoxide may be used in such a manner that a simple oxide film of $TiO_2$ (n=approx. 2.2 to 2.3), $ZrO_2$ (n=approx. 2.0 to 2.1), $Ta_2O_5$ (n=approx. 2.1), $SnO_2$ (n=approx. 1.9 to 2.0), etc. may be obtained; or arbitrary metal alkoxides are so mixed and adjusted as to obtain a film of composite oxides such as $TiO_2$—$SiO_2$, $ZrO_2$—$SiO_2$, $TiO_2$—$ZrO_2$, $In_2O_3$—$SnO_2$, and so forth. When alkoxide of silicon is mixed, adhesivity of the oxide film with the glass base plate 1 increases favorably. Also, when it is desired to form a low reflecting film or a non-glaring film, as the functional coating, use may be made of alkoxide of silicon to obtain a low refractive index film. Further, when an electrically conductive film for use in antenna, humidity sensor, dew-condensation sensor, and so on is desired to be obtained as the functional coating, an arbitrary metal alkoxides may be used so as to be able to obtain the electrically conductive film of $In_2O_3$—$SnO_2$, $SnO_2$:F, $SnO_2$:Sb, and others, by adding thereto a dopant to adjust the functional thin film forming liquid to the intended purpose. Furthermore, when a colored film for use in decoration, display, and so on is desired to be obtained as the functional coating, arbitrary metal alkoxide may be used depending on the purpose, by adding thereto colorant, pigment, and so forth to thereby adjust the functional thin film forming liquid to the intended purpose.

Such metal alkoxide should preferably be contained in the functional thin film forming liquid in a range of from 0.5 to 6.0% by weight, converted in terms of the metal oxide, or more preferably from 1.0 to 3.0% by weight.

After its screen-printing on the base plate, the functional thin film forming liquid is baked, at which time most part of it is vaporized, and there remains the functional coating with the metal oxide as the principal constituent. In this case, if the metal alkoxide is contained in the above-mentioned liquid at a ratio of below 0.5% by weight, converted in terms of the metal oxide, the functional coating after the baking becomes too thin to be stable both chemically and mechanically, or becomes unfavorable in respect of its uniformity in its thickness, outer appearance, and so forth. On the other hand, if the metal alkoxide content exceeds 6.0% by weight, converted in terms of the metal oxide, the film thickness after the baking becomes so thick that cracks inevitably occur in the film, which is unfavorable. In order to obtain the functional coating which is uniform in thickness and excellent in its outer appearance, the functional thin film forming liquid should be applied onto the base plate by screen-printing through a screen having a mesh size of 200 meshes or higher, or more preferably 300 meshes or above (here, by the term "mesh", it is meant the number of apertures per one square inch).

Figure 1C:
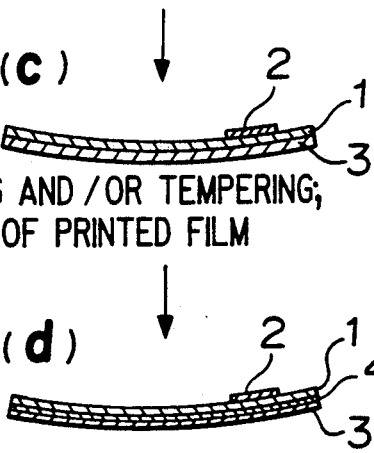

In the next place, as shown in FIG. 1(c), the above-mentioned glass base plate having the printed film thereon is subjected to the bending treatment, or the tempering treatment, or both, by its heating, with simultaneous baking of the printed film 2. In this way, the functional coating is formed. The heating temperature may be the one required for the bending and tempering treatments, which should appropriately be in a range of from about 550° C. to 650° C. While it is possible to bake the printed film, prior to the bending and/or tempering treatment, at a temperature ranging from about 500° C. to 600° C., the simultaneous baking of the printed film and the bending and/or tempering treatment of the glass base plate would simplify the manufacturing process, which advantageously contributes to improvement in productivity, hence reduction in the manufacturing cost.

The bending treatment should preferably be done in such a manner that, as shown in FIG. 1(c), the surface, on which the printed film has been formed, be made concave. The reason for this is that, if the bending treatment is effected in such a manner that the surface with the printed film having been formed thereon is made convex, cracks may occur in the printed film, which results in difficulty in obtaining the functional coating with excellent outer appearance.

It is also feasible that, as shown in FIG. 1(b'), the printed film may be dried, prior to its being subjected to the bending and/or tempering treatment, by heating. In so doing, dusts and dirts become difficult to adhere onto the surface of the printed film, at the time of heating the glass base plate for the bending and/or tempering treatment. The drying temperature may appropriately be in a range of from 50° C. to 200° C.

So far, the process for manufacturing glass with the functional coating according to the present invention has been explained. Now, in the following, the process for manufacturing the combiner for head-up display (HUD) by employing the above-described process for manufacture will be explained.

The HUD combiner is in most cases used as the windshield glass for transporting units such as cars, vehicles, etc. Since a laminated glass is mostly employed from the standpoint of safety, the explanations will be given by taking the manufacture of the HUD combiner with the functional coating having been formed on the surface of the laminated glass, as an example.

The process steps for its manufacture are exactly the same as described with respect to those shown in FIGS. 1(a) to 1(c). FIG. 1(c) shows a case, wherein the glass plate 1 having the printed film 2 on one surface thereof is laminated on a counterpart glass plate 3, and the thus laminated glass plate is subjected to the bending treatment.

Figure 1D:
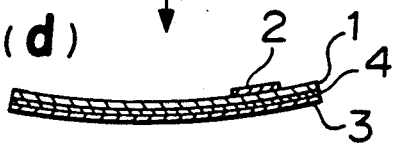

In the next place, as shown in FIG. 1(d), the glass plate 1 which has been subjected to the bending and/or tempering treatment is disposed together with the counterpart glass plate 3, in such a manner that the functional coating may be exposed outside, and then both glass plates are joined together to be laminated with interposition of an intermediate film 4 of a plastic material, whereby the HUD combiner of the laminated glass is obtained.

The functional coating to be used for the HUD combiner should preferably be formed to an optical film thickness of from 400 to 2,300 Å (a product of the refractive index n of the film and the actual film thickness d) so as to be able to maintain the visible transmittance (Tv) of 70% or higher required of the safety glass as well as to be able to reflect a projected image as clear as possible. With a view to attaining such optical film thickness, it should be preferred that, at the step shown in FIG. 1(b), the film thickness during the screen-printing of the functional thin film forming liquid be adjusted by taking into consideration decrease in the film thickness due to its baking.

SOLE PREFERRED EXAMPLE

The surface of an ordinary float glass plate 1 of 2 mm thick, which had been cut and chamfered, was polished with cellium oxide, after which the glass plate was sufficiently rinsed with demineralized water, and then dried by blowing nitrogen gas against it. Onto this glass surface, a functional thin film forming liquid containing therein 1.2% by weight of alkoxide of titanium and silicon, converted in terms of the metal oxide, and having a viscosity of 4,000 cps (at 25° C.) was screen-printed through a nylon screen of 380-mesh size, and the film as printed was left to stand for a period of from 3 to 4 minutes, followed by sufficiently leveling the surface. After this, the printed film was dried for a period of from 10 to 15 minutes in a clean oven maintained at a temperature of from 120° C. to 130° C. Thickness of the printed film after the drying was about 1.5 μm, and its surface was completely dried and leveled flat and smooth to such an extent that there was no apprehension whatsoever of any damage to be caused to the film, even if dusts and dirts would be adhered onto it. The surface of the glass plate after the drying, on which the printed film 2 had been formed, was made to expose outside, and then it was laminated with another sheet of the glass plate (in bronze color, and having a thickness of 2 mm) and subjected to the bending treatment, as shown in FIG. 1(c), with simultaneous baking of the printed film 2 to form the high reflective film. This functional coating had its optical film thickness of 700 Å (refractive index n=2.0 (6328 Å), and the actual film thickness d of 350 Å). These glass plates 1 and 2 were made into a laminated glass with a PVB (polyvinyl butyral) film 4 being interposed between them as shown in FIG. 1(d), thereby obtaining the combiner for the head-up display (HUD).

FIG. 2 indicates the characteristics of transmittance through the portion of the functional thin film as well as reflection (incident angle of 0 degree) at the surface of the functional thin film at the inner side of a car, when the one side of the combiner, on which the functional coating had been formed, was made the inner side of the car.

FIG. 3 shows the reflection characteristics of the functional thin film at the inner side of the car with the incident angle of 65 degrees at the portion of the functional thin film. The HUD combiner as formed had a favorable outer appearance, which was free from haze and optical distortion.

As has been described in the foregoing, the process according to the present invention is capable of manufacturing glass with functional coating which is formed on a very limited portion of the glass base plate having a large area.

In particular, the present invention is capable of manufacturing with good efficiency the glass coated with the functional thin film having uniform film thickness, good outer appearance, and excellent chemical as well as mechanical resistance, which is attained by the process steps of screen-printing on the glass base late of the functional thin film forming liquid having a viscosity ranging from 1,000 to 20,000 cps, and containing therein 0.5 to 6.0% by weight of metal alkoxide, converted in terms of the metal oxide, and baking the printed film.

Moreover, the manufacturing steps will become simpler by the simultaneous formation of the functional coating by its baking and the bending and/or tempering treatment of the base plate, which would contribute to increased productivity and reduced manufacturing cost, with the consequence that the HUD combiner of good outer appearance can be produced with good efficiency.

I claim:

1. A process for manufacturing glass with functional coating, which is characterized by the steps of:
   1) forming a printed film on a predetermined portion of a glass plate by screen-printing of a liquid for forming functional coating containing therein a metal alkoxide and a thickener, and having a viscosity of from 1,000 to 20,000 cps.; and
   2) subjecting said glass plate to the bending and/or tempering treatment by heating the same, with simultaneous baking of said printed film to thereby form the functional coating containing the metal oxide as the principal constituent.

2. The process for manufacturing a combiner for head-up display according to claim 1, characterized in that the optical film thickness of said functional coating after its baking ranges from 400 to 2,300 Å.

3. The process for manufacturing glass with functional coating according to claim 1, characterized in that, as the liquid for forming the functional coating, use is made of a liquid containing therein 0.5 to 6.0% by weight of a metal alkoxide, converted in terms of the metal oxide.

4. The process for manufacturing glass with functional coating according to claim 1, characterized in that a printed film is formed on the glass plate by the screen-printing, and then, prior to subjecting the glass plate to bending and/or tempering treatment by heating, said printed film is dried at a temperature of from 50° C. to 200° C.

5. The process for manufacturing glass with functional coating according to claim 1, characterized in that said glass plate is subjected to the bending treatment, or the tempering treatment, or both, in a manner to render one surface of the glass plate, on which said printed film has been formed, to be concaved.

6. A process for manufacturing glass with functional coating as a combiner for head-up display, characterized in that, after forming the functional coating by simultaneously bending and/or tempering the glass plate and baking the printed film, according to the process of claim 1, said glass plate with the functional coating is joined together with another sheet of glass plate with interposition of a plastic intermediate film between them in a manner to cause the surface of said glass plate, on which said functional coating has been formed, to be exposed outside, thereby forming a laminated glass plate.

* * * * *